(12) United States Patent
Licata et al.

(10) Patent No.: US 6,485,004 B1
(45) Date of Patent: Nov. 26, 2002

(54) TRAILER GATE-RAMP LIFT SPRING ASSIST APPARATUS

(76) Inventors: Kenneth Rocco Licata, 10 S. Vrain St., Denver, CO (US) 80219; Cheryl Lynn Licata, 10 S. Vrain St., Denver, CO (US) 80219

( * ) Notice: Subject to any disclaimer, the term of this patent is extended or adjusted under 35 U.S.C. 154(b) by 25 days.

(21) Appl. No.: 09/842,152

(22) Filed: Apr. 26, 2001

(51) Int. Cl.[7] .............................. B62D 33/08; F16F 9/32; F16F 9/54
(52) U.S. Cl. .................. 267/74; 267/179; 267/177; 296/50; 296/57.1
(58) Field of Search .................. 267/166, 177, 267/179, 73, 74; 296/50, 57.1

(56) References Cited

U.S. PATENT DOCUMENTS

| | | | | |
|---|---|---|---|---|
| 2,653,845 A | * | 9/1953 | Benjamin | 296/61 |
| 4,032,129 A | * | 6/1977 | Larsson | 267/179 |
| 4,348,045 A | * | 9/1982 | Hori et al. | 296/14 |
| 4,603,461 A | * | 8/1986 | Whippie et al. | 29/227 |
| 4,640,049 A | * | 2/1987 | Duncan | 49/197 |
| 4,657,233 A | * | 4/1987 | Vroom | 267/155 |
| 5,297,840 A | * | 3/1994 | Size et al. | 296/50 |
| 6,098,970 A | * | 8/2000 | Lowe | 267/179 |
| 6,126,223 A | * | 10/2000 | Rayburn | 296/57.1 |
| 6,183,031 B1 | * | 2/2001 | Ballard et al. | 296/57.1 |

* cited by examiner

Primary Examiner—Douglas C. Butler
Assistant Examiner—Melody M. Burch

(57) ABSTRACT

This invention is a lift kit for conventional trailers which include a foldable tailgate or trailer ramps mounted for pivotal movement about a gate or ramp axis from a transport position wherein the gate or ramps are elevated for transport to an unload position wherein the gate is lowered to permit removal of objects carried on the trailer, which incorporates a heavy duty helical elongated spring having a plurality of coils with one end fixedly mounted at the trailer end, and at the other end of the spring an adjustment which resists the force of gravity as the gate or ramps move from its upper travel position to its lower unload position which is fixedly mounted to the trailer gate or trailer ramp.

1 Claim, 10 Drawing Sheets

TRAILER GATE-RAMP LIFT SPRING ASSIST APPARATUS

BACKGROUND OF THE INVENTION

This invention is a trailer-gate and trailer-ramp lift kit relates to spring assist apparatus for assisting manual repositioning of trailer gates or trailer ramps which consists of 3 eyelets with shanks, 2 used for spring support anchors, 1 used for an adjustment for spring tension, a helical elongated coil spring and a flexible cable.

These gates and ramps are used on conventional, commercial, parks and recreational trailers used by cities, counties and states for use in hauling landscape equipment such as walk-behind mowers, aerators, riding lawn mowers, pipe pulling equipment for underground sprinkler systems, sidewalk-wheeled sweepers and the like. In construction such as backhoes, bob-cats, crawling well-drilling equipment and the like. These trailer gates or trailer ramps in order to support these loads are usually constructed of steel and have considerable weight are generally relatively long to permit a relatively shallow incline. They are usually pivoted adjacent the bottom edge of the gate or ramp and the entire weight of the gate or ramp is supported above the pivotal point.

This helical elongated coil spring tension from the anchored spring support on the trailer to the anchored spring support on the trailer gate or trailer ramp effectively reduces the weight of the trailer gate or trailer ramp, making it easier to let down or lift up thereby reducing risk or injury to the back or arm of the operator, especially operators of walk-behind mowers—as the result of fatigue from cutting and maintaining grass in a regular workday, also from letting down and lifting the trailer gate up a multitude of times in a regular workday.

When the trailer gate or trailer ramp is in vertical position and the safety attachment or latch is released to lower the trailer gate or trailer ramp, the trailer gate or trailer ramp can be eased down without having the full load on the operator because of the tension on the helical elongated coil spring.

The problems attendant trailer ramps are known and various solutions have been proposed U.S. Pat. No. 3,843,565 is directed to a hydraulic system for providing a source of power to raise and lower a trailer ramp. Such a system is usable only if a source of hydraulic fluid under pressure is available from the trailer itself or from a draft vehicle.

U.S. Pat. No. 4,065,824 illustrates a coil spring for exerting a force to articulate a lip pivotally attached to a bridge plate upon pivotal movement of the bridge plate.

U.S. Pat. No. 4,657,233 which incorporates bearing to reduce the friction attendant pivotal movement of the ramps. A housing protective of a spring located at the pivoting junction.

U.S. Pat. No. 6,183,031 the provision of a counter-balance formed in a kit of pulleys, coiled spring and cable being mounted directly on the horizontal toprail of the trailer support frame with a counter-balance, with a cable attached to the trailer gate.

BRIEF SUMMARY OF THE INVENTION

Therefore, a primary object of the present invention is the provision of an improved spring assist apparatus for trailer gate or trailer ramp and a method for using the same.

A further object of this present invention is the provision of an apparatus which may be formed as a kit capable of being mounted upon conventional and commercial trailers.

A further object of the present invention is to provide apparatus for relieving the hazards to an operator attendant unloading and loading trailer transported wheeled vehicles.

A further object of the present invention is the provision of an improved apparatus for trailer gates and trailer ramps which may be added to conventional trailers and which provide less hardware, easier maintenance, easier access for malfunctions, broken parts and easier access for replacement for broken parts.

A further object of the present invention is the provision of minimum interference with the load bearing capabilities of the trailer.

A further object of the present invention is to provide a kit for trailer gates and trailer ramps with conventional and commercial trailers more economical to manufacture.

A further object of the present invention is the provision to have more room on the top horizontal top-rail in order to add needed accessories to the trailer with the apparatus to the rear of the trailer anchored thereof.

A further object of the present invention is the provision of an improved kit for trailer gates or trailer ramps which is improved, durable in use and efficient in operation.

A further object of the present invention is this can be fixedly mounted on square tubing trailer frames, angle iron trailer frames, solid steel trailer frames, wood frames with ramps or trailer gates.

A further object of this present invention is the eyelet shanks that are threaded that are attached to the helical coil spring can be fixedly mounted in either direction, horizontally or vertically, for any attachment to any trailer with a trailer gate or ramps.

A further object of the present invention when mounted at the proper height from the trailer bed, it will reduce the gate weight lowering and lifting.

These and other objects of the present invention will become apparent to those skilled in the art as the description thereof proceeds.

BRIEF DESCRIPTION OF THE SEVERAL VIEWS OF THE DRAWING

Referring jointly to FIGS. 1 & 2, there are shown conventional trailers. In FIG. 1 the numeral 10 designates a trailer with a gate 22 to unload and load vehicles or equipment. In FIG. 2 the numeral 10' designates a trailer with a pair of ramps 40, 42 to unload and load vehicles or equipment. In FIG. 1 trailer 10 is comprised of a trailer frame 12, formed of a horizontal toprail 14 and a horizontal bottom rail 16, comprises of plurality of vertical rail supports 18 and a trailer bed 20, which excludes having a brace support 64 fixedly attached to trailer 10' shown in FIG. 2.

Figure 1:
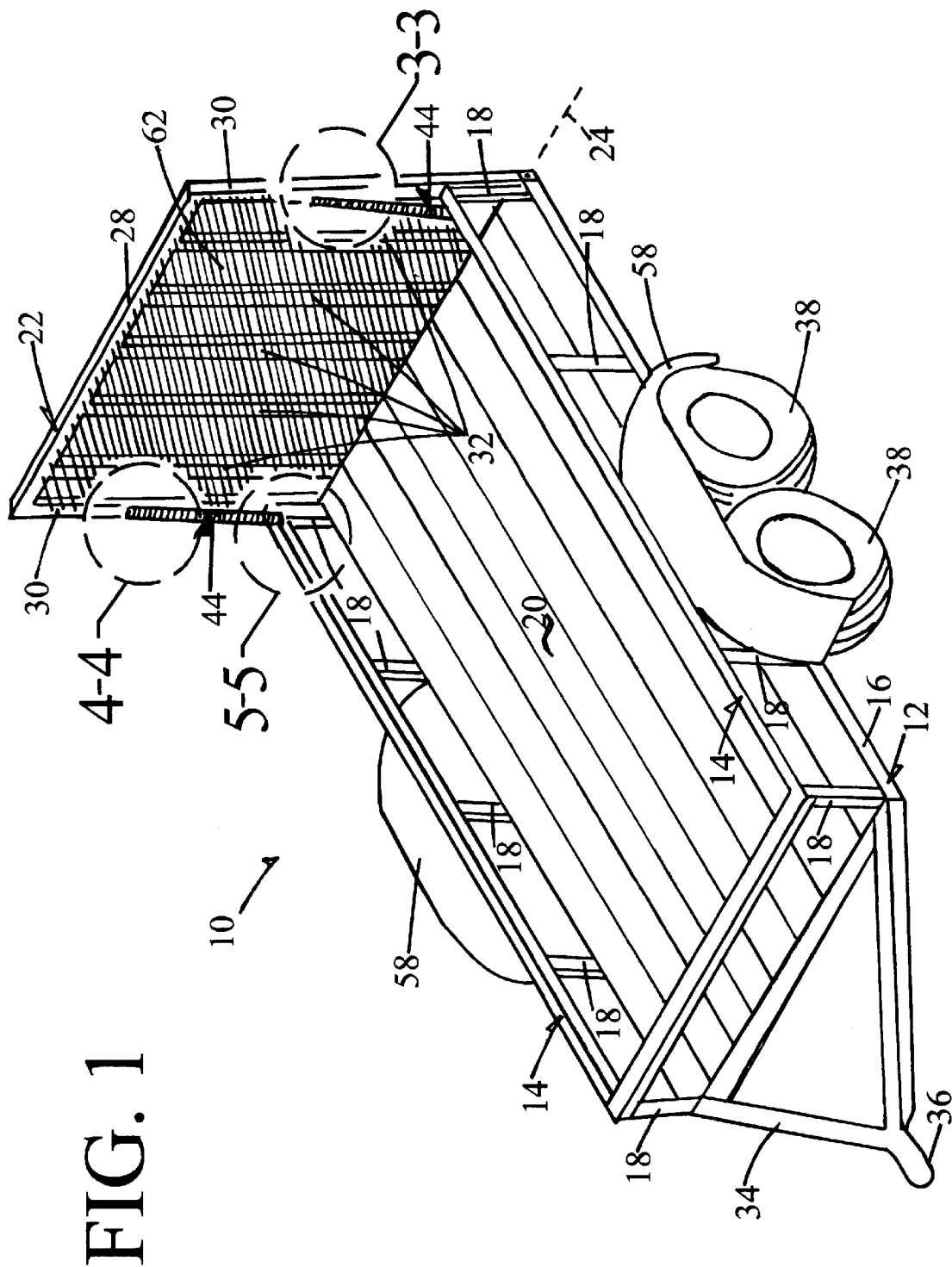
FIG. 1 is a perspective view of a trailer that has a pivotal mounted trailer gate having the spring assist apparatus of the present invention thereon.

A gate 22 to unload and load vehicles or equipment comprises of a hinge 24 connected to the bottom frame member 26 of gate 22 and provides gate 22 pivotal movement about a horizontal axis with an upper frame member 28 joined by side frame members 30. A plurality of cross members 32 extending between frame members 26, 28 and extend parallel to side frame members 30. A strong screen mesh 62 covers between and cross frames 32 and side frame members 30.

The front of the trailer is a tongue 34 and a hitch 36. A pair of fenders 58 are mounted on the opposite sides of trailer 10 and surround a pair of wheels 38 which support the trailer 10 for transporting.

Figure 2:
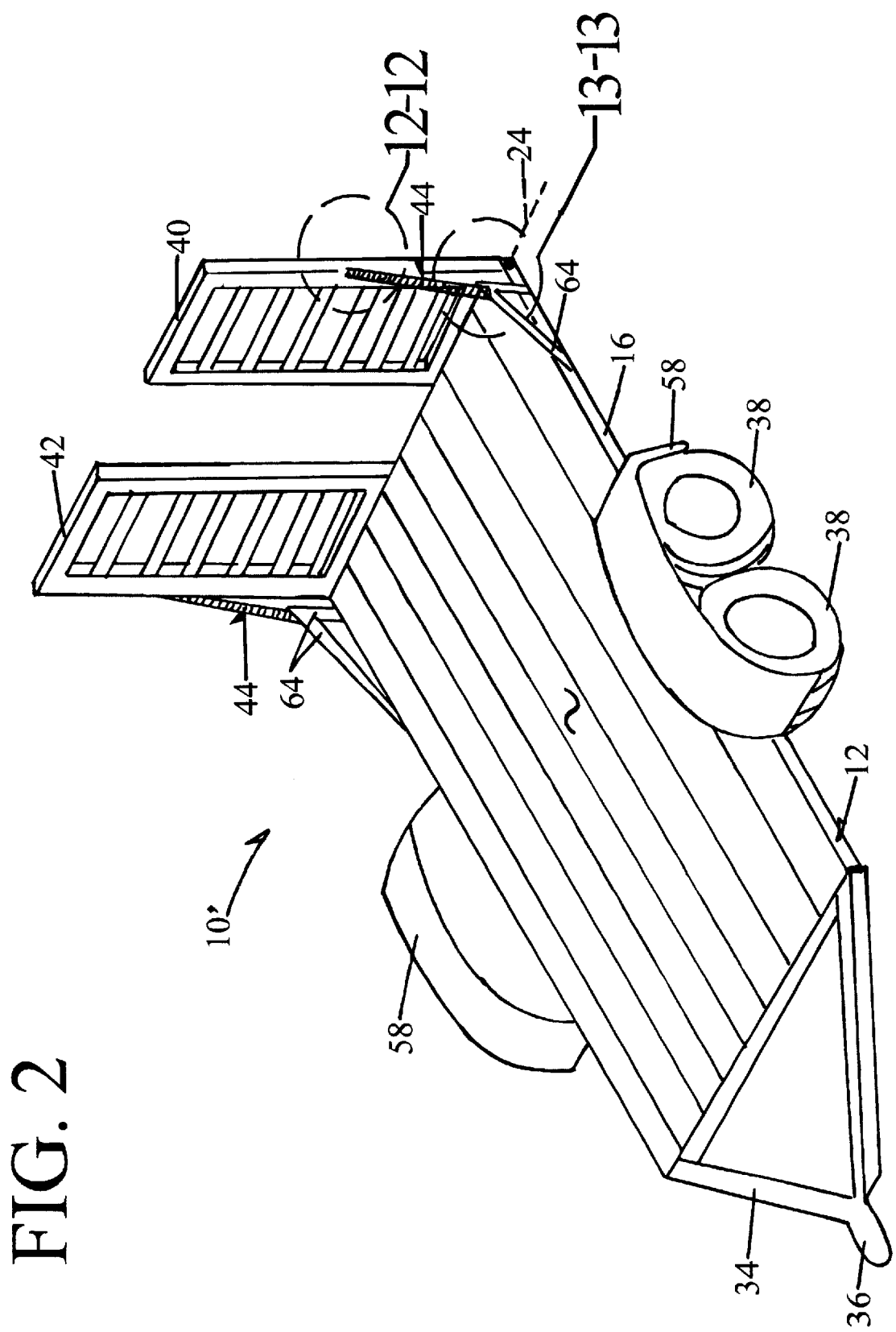
FIG. 2 is a perspective view of a trailer that has pivotal mounted trailer ramps having the spring assist apparatus of the present invention thereon.
Figure 3:
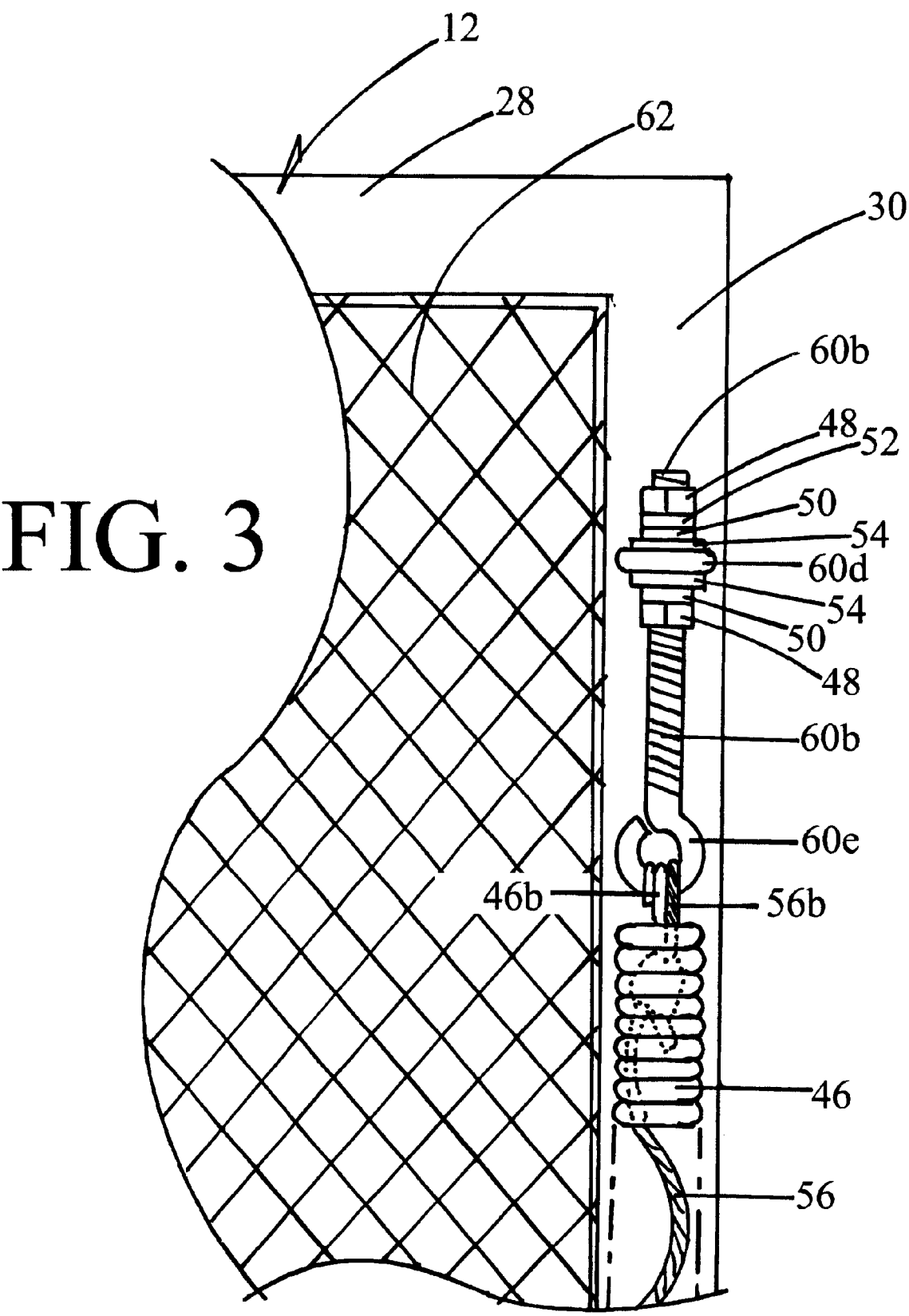
FIG. 3 is a sectional view taken along lines 3—3 of the trailer gate in the elevational view at the end of the trailer of the spring assist apparatus of the present invention showing the position of the spring attached to an eyelet having a threaded shank for adjustment.
Figure 4:
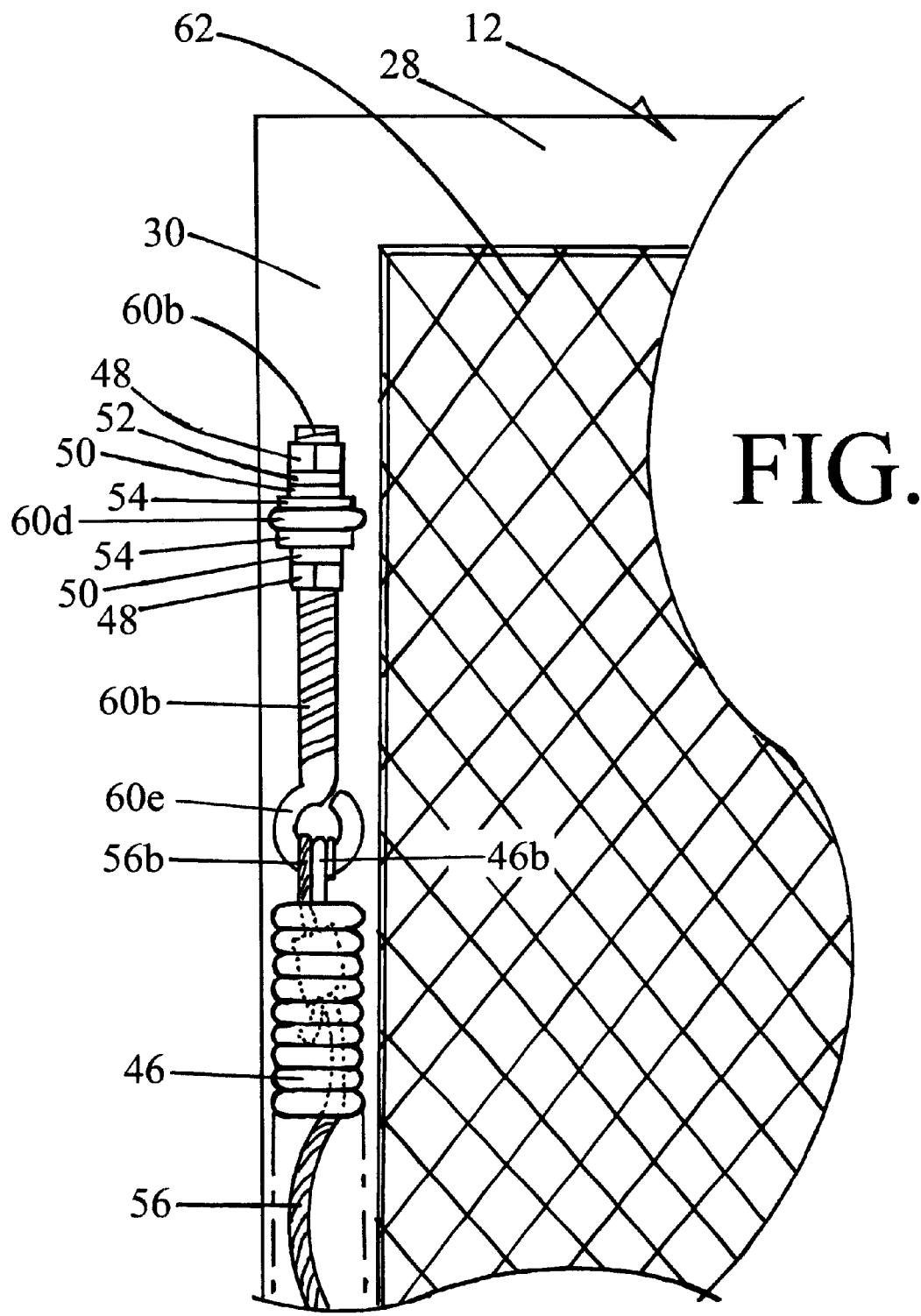
FIG. 4 is a sectional view taken along lines 4—4 which is a view similar to FIG. 3 showing the opposite side of the trailer gate at the end of the trailer.
Figure 5:
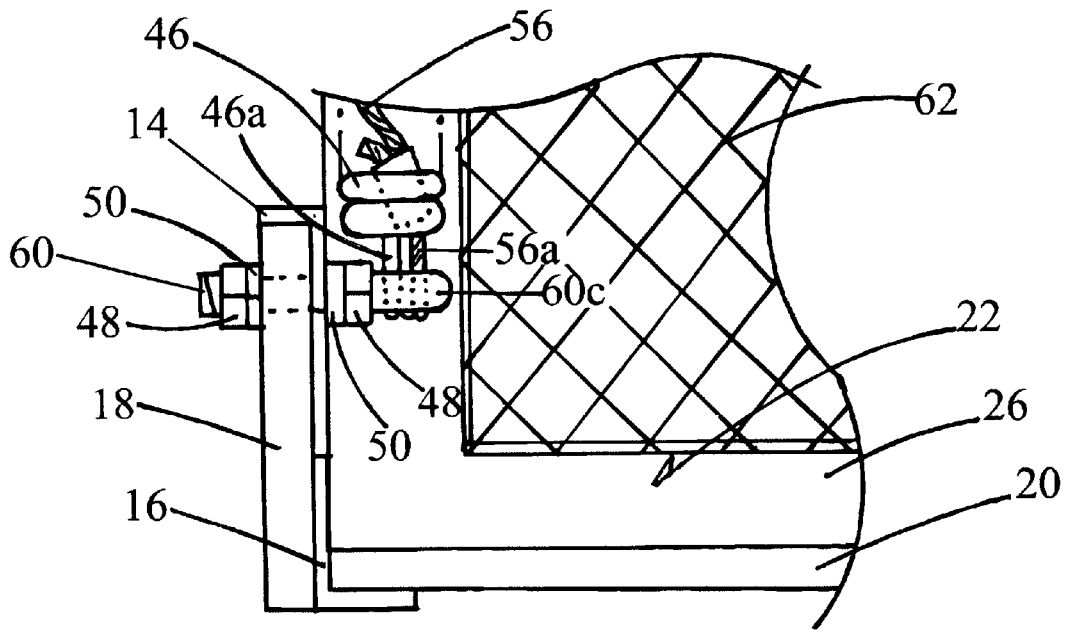
FIG. 5 is a sectional view taken along lines 5—5 of the trailer gate in the elevational view at the end of the trailer of the spring assist apparatus of the present invention showing the position of the spring attached to the eyelet having a threaded shank fixedly mounted at the end of the trailer where the vertical rail support meets the horizontal toprail.
Figure 6:
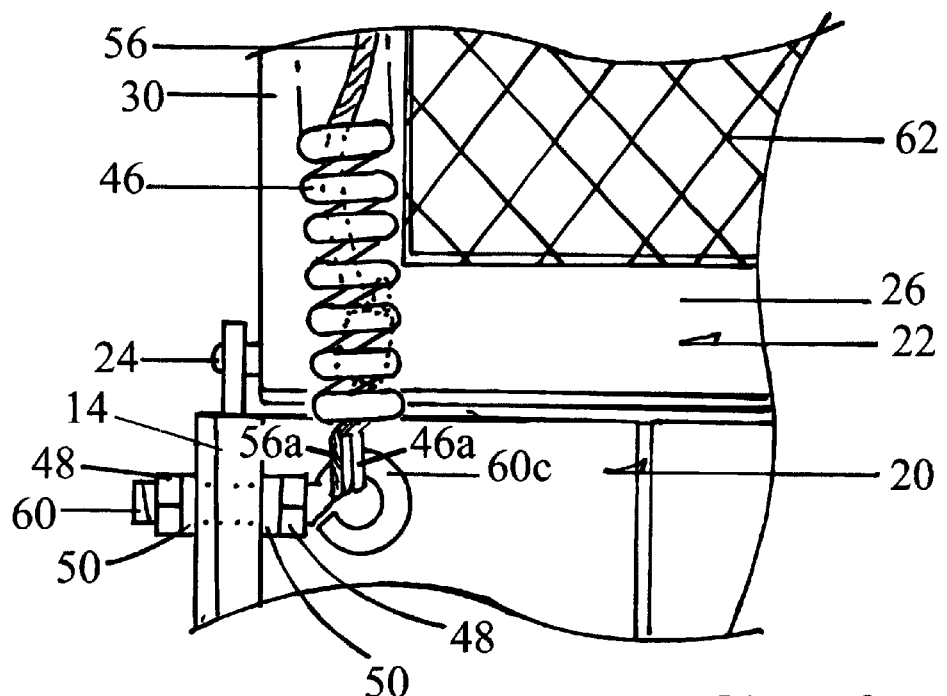
FIG. 6 is an enlarged sectional view of the trailer gate in the unload position at the end of the trailer of the spring assist apparatus of the present invention showing the position of the spring attached to the eyelet with threaded shank fixedly mounted at the end of the trailer where the vertical rail support meets the horizontal toprail.
Figure 7:
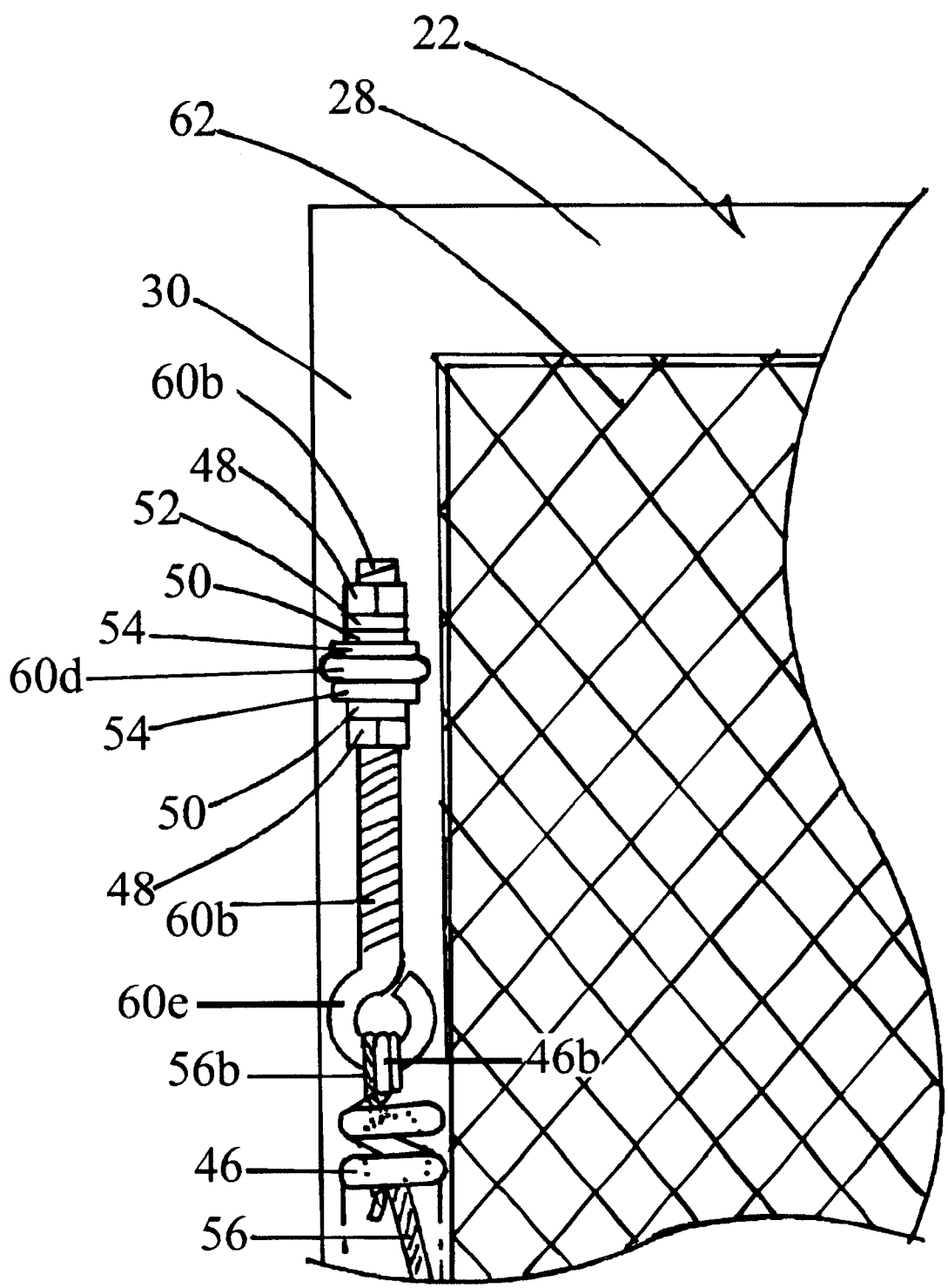
FIG. 7 is an enlarged sectional view showing the spring assist apparatus of the present invention showing the position of the spring attached to an eyelet having a threaded shank for adjustment fixedly mounted to the trailer gate.
Figure 8:
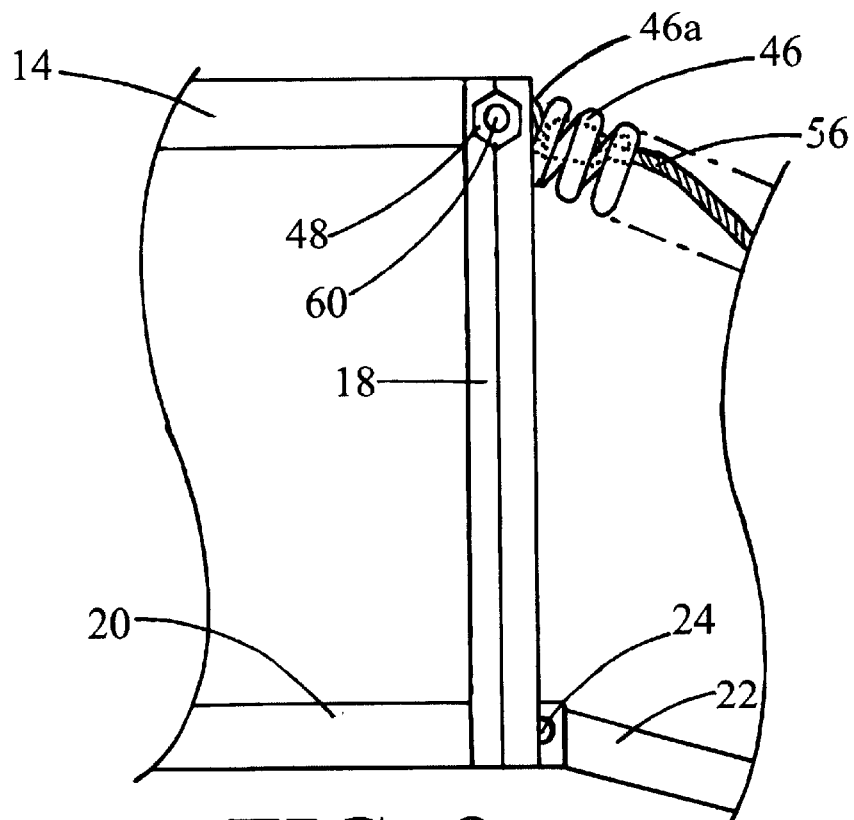
FIG. 8 is an enlarged sectional side view of the trailer gate in unload position at the end of the trailer of the spring assist apparatus of the present invention showing the position of the spring attached to the eyelet having a threaded shank fixedly mounted at the end of a trailer where the vertical support meets the horizontal toprail.
Figure 9:
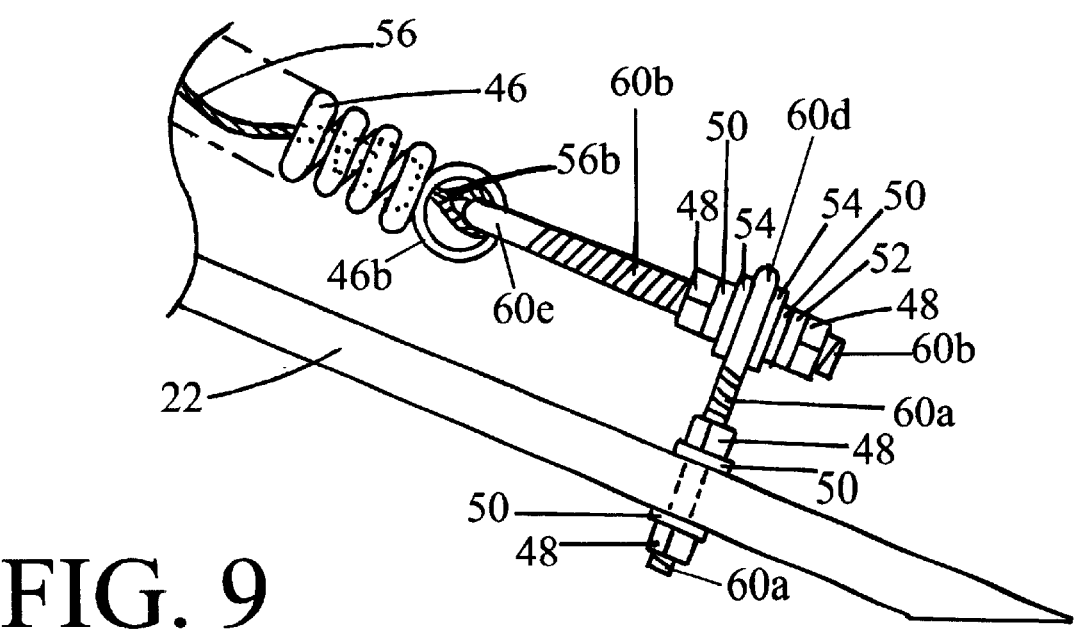
FIG. 9 is an enlarged sectional side view showing the spring assist apparatus of the present invention showing the position of the spring attached to an eyelet having a threaded shank for adjustment attached to an eyelet having a threaded shank fixedly mounted to the trailer gate.
Figure 10:
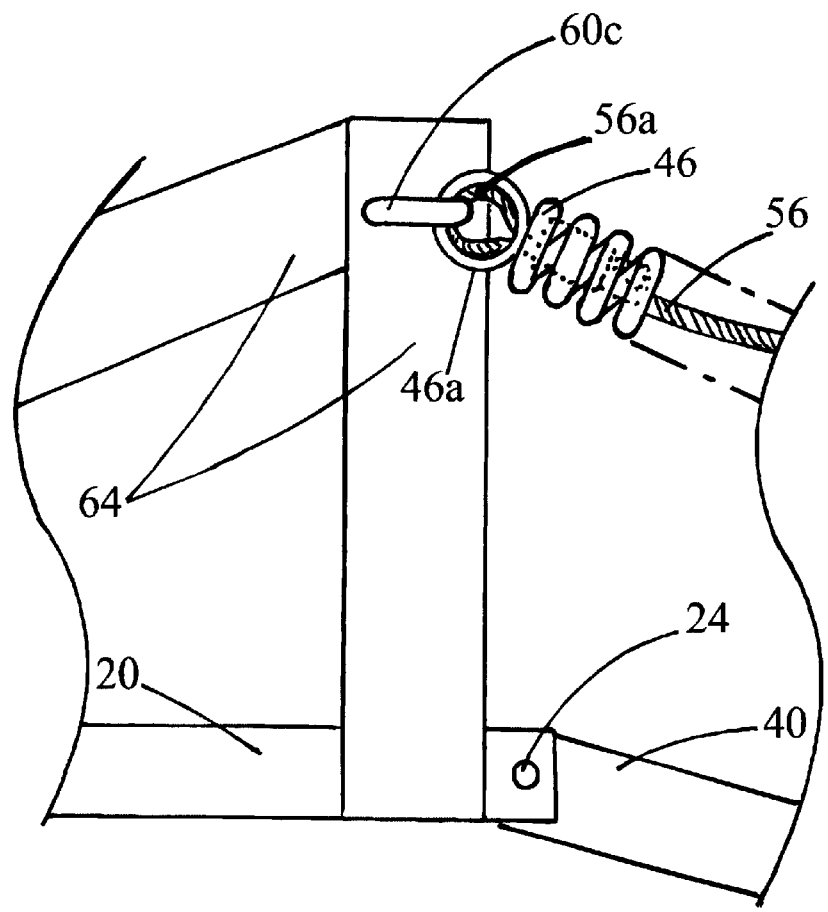
FIG. 10 is an enlarged sectional side view of the trailer ramp in the unload position, at the end of the trailer of the spring assist apparatus of the present invention showing the position of the spring attached to the eyelet having a threaded shank fixedly mounted at the end of the trailer to a trailer support bracket.
Figure 11:
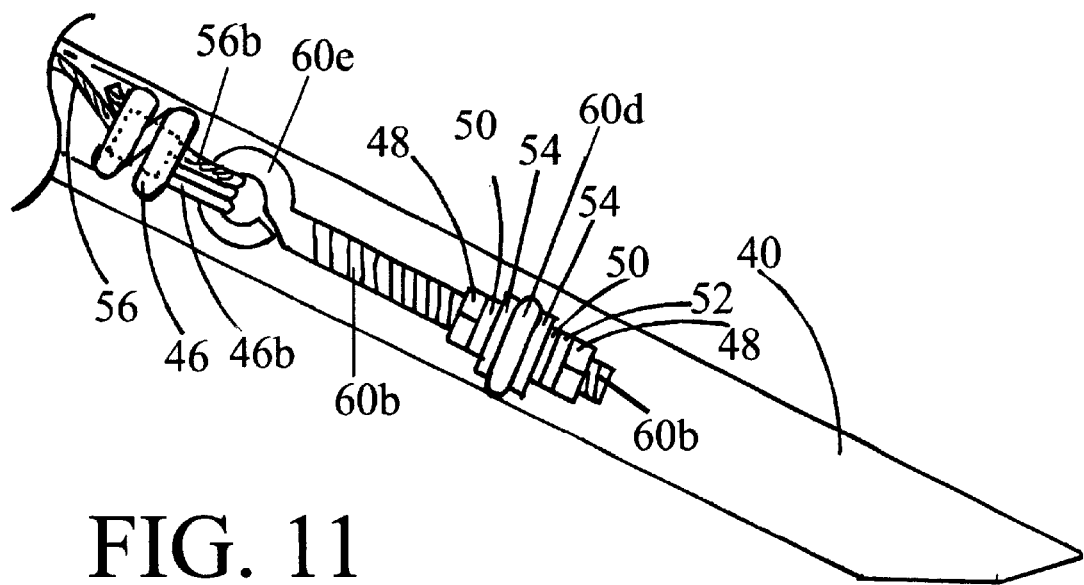
FIG. 11 is an enlarged sectional side view showing the spring assist apparatus of the present invention showing the position of the spring attached to an eyelet having a threaded shank for adjustment fixedly mounted to the trailer ramp.
Figure 12:
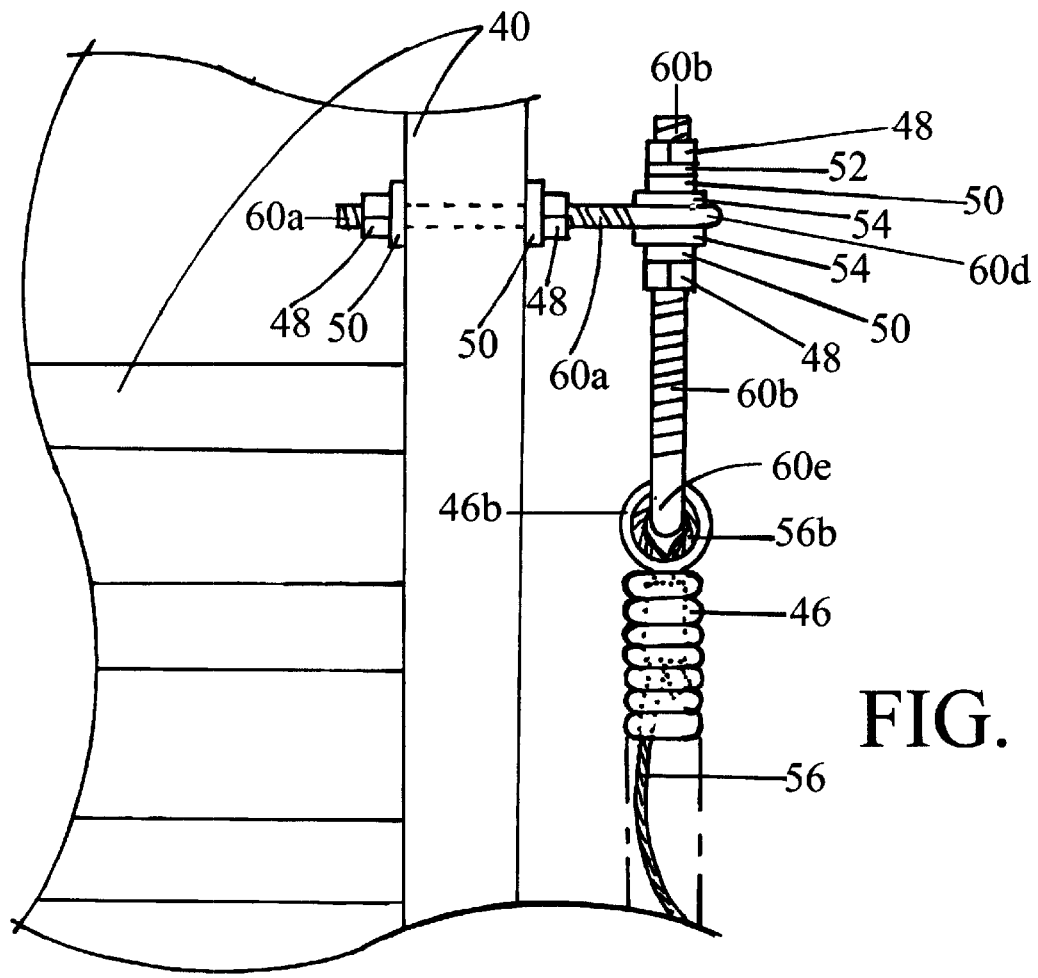
FIG. 12 is a sectional view taken along lines 12—12 of the trailer ramp in the elevational view at the end of the trailer of the spring assist apparatus of the present invention showing the position of the spring attached to an eyelet having a threaded shank for adjustment attached to an eyelet having a threaded shank fixedly mounted to the trailer ramp.
Figure 13:
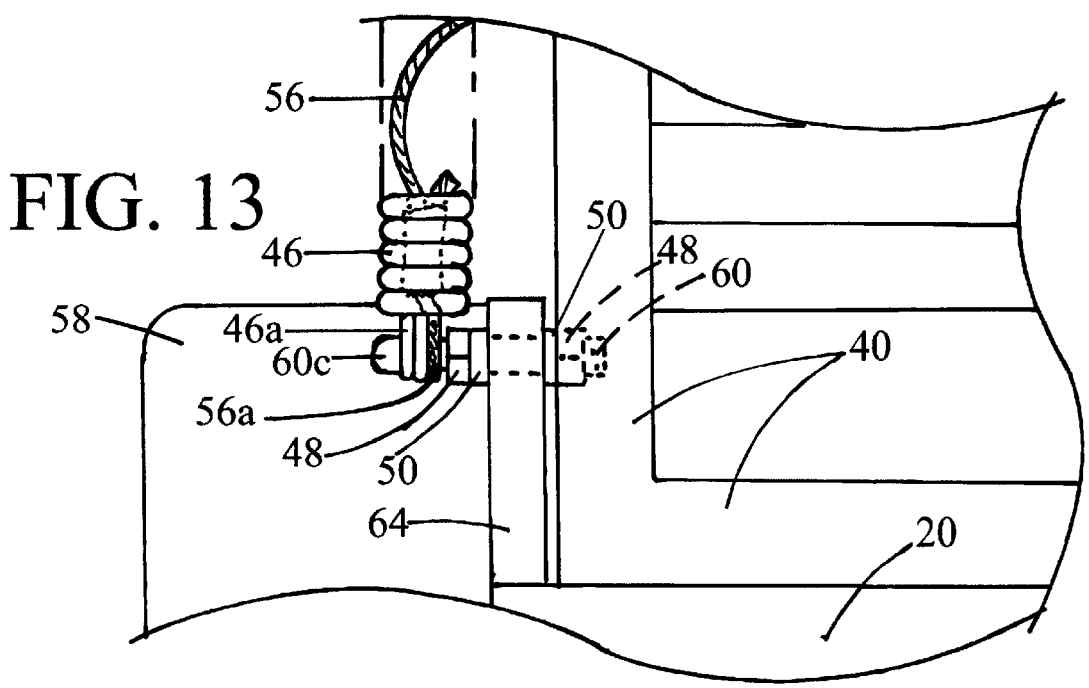
FIG. 13 is an enlarged sectional view taken along lines 13—13 of the trailer ramp in the elevational view at the end of the trailer of the spring assist apparatus of the present invention showing the position of the spring attached to an eyelet having a threaded shank fixedly mounted to a trailer support bracket.
Figure 14:
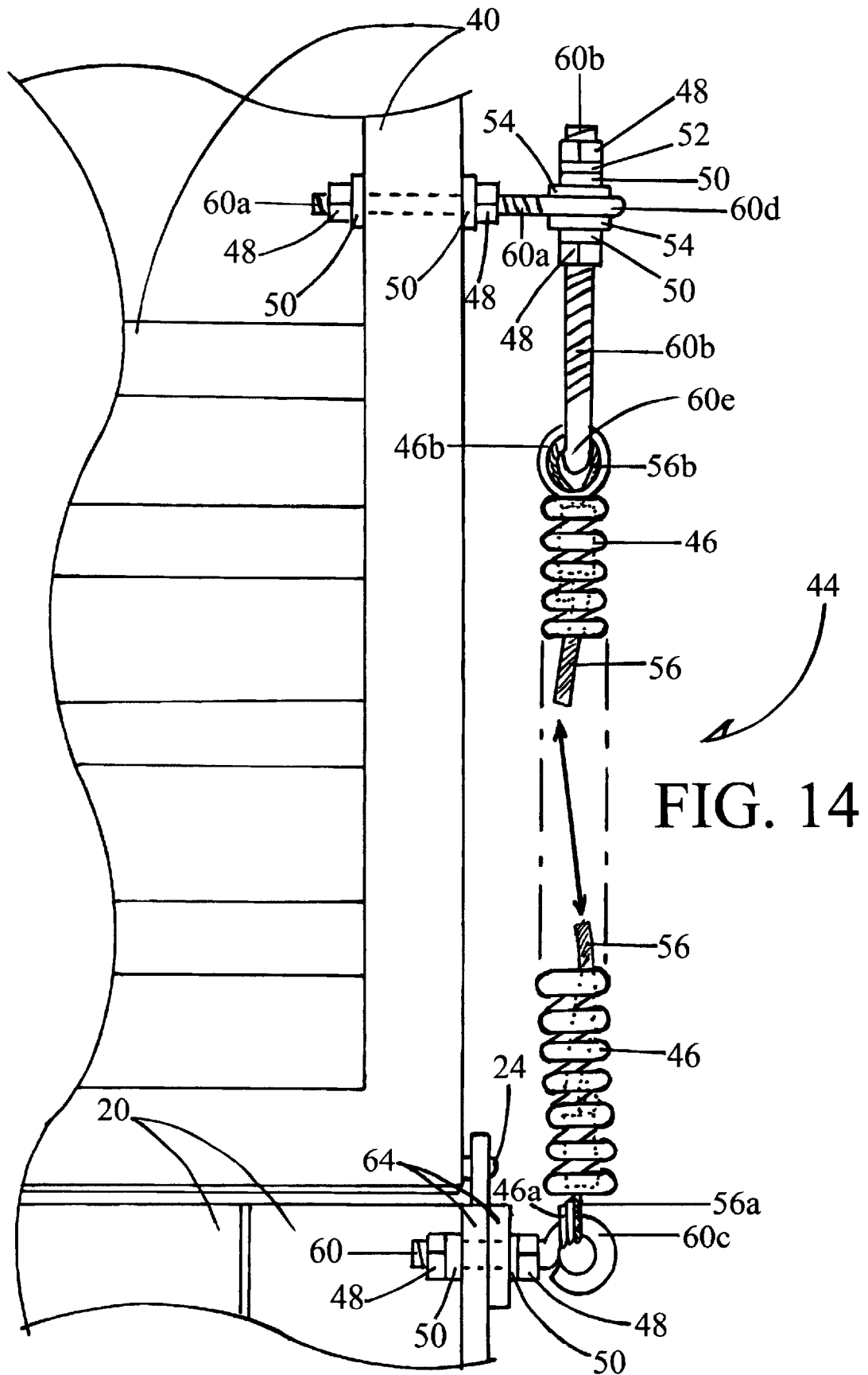
FIG. 14 is an enlarged sectional view of the trailer ramp in unload position at the end of the trailer of the spring assist apparatus of the present invention showing the position of the spring attached to an end to an eyelet having a threaded shank fixedly mounted at the end of the trailer to a support bracket, at another end attached to an eyelet having a threaded shank for adjustment then attached to an eyelet having a threaded shank fixedly mounted to a trailer ramp.

FIG. 2 trailer 10' excludes a horizontal toprail 14, vertical rail supports 18 and a gate 22 with a hinge 24. To unload and load vehicles and equipment are a pair of ramps 40, 42 which are pivotally secured for movement about a horizontal axis at the end of trailer 10'. FIG. 2 includes a brace support 64 which is fixedly attached to trailer 10'.

Normally during transport of trailer 10 (See FIG. 1) the gate 22 or during transport of trailer 10' (See FIG. 2) the ramps 40, 42 are secured with a locking bar, chain or some other type of securing device not shown.

Referring jointly to FIGS. 3, 4, 5, 6, 7, 8 and 9 spring assist apparatus device 44 will be described in detail for FIG. 1 trailer 10. The spring assist apparatus device 44 is comprised of a heavy duty helical elongated coil spring 46. Coil spring 46 includes a first end 46a which is connected to the first spring support eyelet 60c. The second end 46b of the helical elongated coil spring 46 is connected to the third spring support eyelet 60e. The threaded shank 60 of first spring support eyelet 60c is connected to the end of trailer 10 via a pair of spaced apart nuts 48, a pair of spaced apart small flat washers 50. The threaded shank 60b of third spring support eyelet 60e extends through the open center of second spring support eyelet 60d. Threaded shank 60b and spring support eyelet 60d are joined together via pair of spaced apart nuts 48, a lock washer 52, a pair of spaced apart large flat washers 54, a pair of spaced apart small flat washers 50 for adjustment of spring tension of spring 46. The threaded shank 60a of second spring support eyelet 60d is connected to gate 22 via a pair of spaced apart nuts 48, a pair of spaced apart small flat washers 50. Within and throughout the open center of the helical elongated coil spring 46 is a flexible safety cable 56. The first end 56a of cable 56 is attached to the first spring support eyelet 60c. The second end 56b of cable 56 is attached to third spring support eyelet 60e freely to when the cable 56 is not taut.

Referring jointly to FIGS. 10, 11, 12, 13 and 14 spring assist apparatus device 44 will be described in detail for FIG. 2 trailer 10'. The spring assist apparatus device 44 is comprised of a heavy duty helical elongated coil spring 46. Coil spring 46 includes a first end 46a which is connected to the first spring support eyelet 60c. The second end 46b of the helical elongated coil spring 46 is connected to the third spring support eyelet 60e. The threaded shank 60 of first spring support eyelet 60c is connected to the end of trailer 10' via a pair of spaced apart nuts 48 and a pair of spaced apart small flat washers 50, to a brace support 64 which is permanently attached as part of trailer 10' on the side of the horizontal bottom rail 16. The threaded shank 60b of third spring support eyelet 60e extends through the open center of second spring support eyelet 60d. Threaded shank 60b and spring support eyelet 60d are joined together via a pair of spaced apart nuts 48, a lock washer 52, a pair of spaced apart large flat washers 54, a pair of spaced apart small flat washers 50 for adjustment of spring tension of coil spring 46. The threaded shank 60a of second spring support eyelet 60d is connected to ramp 40, 42 of trailer 10' via a pair of spaced apart nuts 48, a pair of spaced apart flat washers 50. Within and throughout the open center of the helical elongated coil spring 46 is a flexible safety cable 56. The first end 56a of cable 56 is attached to the first spring support eyelet 60c. The second end 56b of cable 56 is attached to third spring support eyelet 60e freely to move when the cable is not taut.

The spring assist apparatus 44 of the present invention improves the raising and lowering of the gate 22 or ramps 40, 42 because it resists the force of gravity when a proper adjustment to the spring tension is made with the proper height at the end of trailer 10 and at the end of trailer 10'. In the absence of the spring assist apparatus 44 the gate 22 or ramps 40, 42 is likely to have full weight by reason of gravity and injure persons in the vicinity because of inclement weather, fatigue or improper lifting techniques.

In the drawings and specification, there has been set forth an illustrative embodiment of the present invention and although specific terms are employed, these are used in a generic sense only and not for purposes of limitation. Substitution of equivalents are contemplated as circumstance may suggest or render expedient, but is intended to cover the application or implementation without departing from the spirit or scope of the claims of the present invention.

We claim:

1. A spring assist apparatus for assisting pivotal movement intermediate two elements of a trailer having a gate or ramps, said spring assist apparatus comprising: a helical elongated coil spring having an open center, said coil spring having a first end, said first end of said coil spring adapted for connection to a first spring support eyelet, said first spring support eyelet having a threaded shank adapted for attachment to the trailer; a second spring support eyelet having an open center, said second spring support eyelet having a threaded shank adapted for attachment to the gate or ramps of the trailer; a third spring support eyelet, said third spring support eyelet having a threaded shank adapted for connection to said second spring support eyelet wherein the threaded shank of said third spring support eyelet extends through the open center of said second spring support eyelet; said coil spring having a second end, said second end of said coil spring connected to said third spring support eyelet; a flexible cable extending through the open center of the coil spring, said cable having a first end adapted for attachment to the first spring support eyelet and a second end adapted for attachment to the third spring support eyelet, wherein an adjustment of tension of said coil spring occurs via an adjustment of the threaded shank of the third spring support eyelet.

* * * * *